United States Patent Office 3,687,656
Patented Aug. 29, 1972

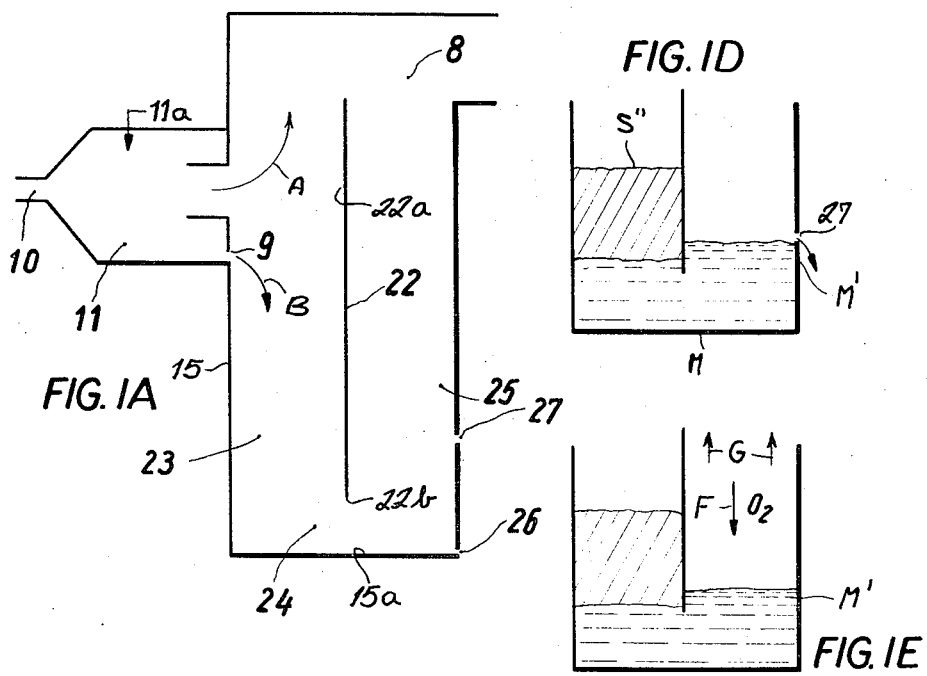
FIG. IA
FIG. ID
FIG. IE
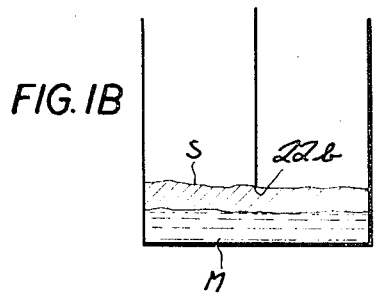
FIG. IB
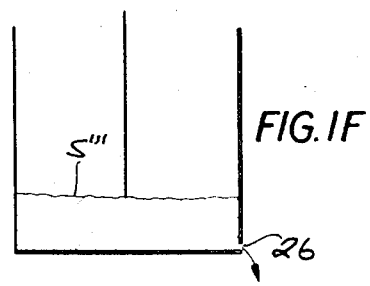
FIG. IF
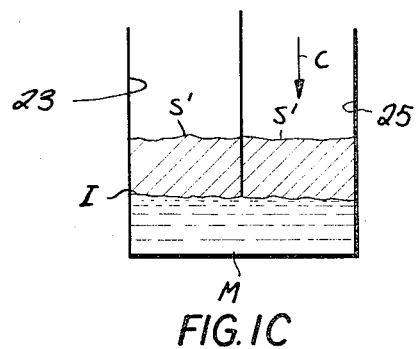
FIG. IC
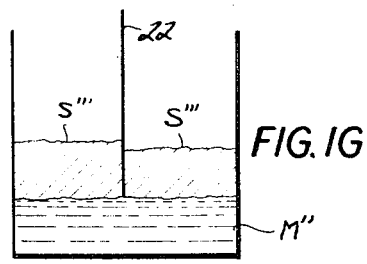
FIG. IG
Carl-August Maelzer
Lothar Reh
Inventor.
By Karl F. Ross
Attorney

3,687,656
METHOD OF TREATING METAL ORES AND ORE CONCENTRATES
Carl-August Maelzer, Frankfurt, and Lothar Reh, Bergen-Enkheim, Germany, assignors to Metallgesellschaft Aktiengesellschaft, Frankfurt am Main, Germany
Filed Apr. 20, 1970, Ser. No. 30,082
Claims priority, application Germany, Apr. 25, 1969,
P 19 21 184.8
Int. Cl. C22b 15/06
U.S. Cl. 75—74                                    7 Claims

ABSTRACT OF THE DISCLOSURE

A method of and an apparatus for the recovery of metals from copper of nickel ores or ore concentrates in which the raw material is subjected to pyrometallurgical treatment in a cyclone-type furnace, the melt being reacted with a slag and introduced into a chamber subdivided by a vertical partition reaching close to the bottom of the chamber so as to define a first compartment communicating with the cyclone furnace and the further compartment communicating with the first compartment below the partition and having outlets for the melt. The process involves presence of a slag initially in both compartments, the removal of the slag layer in the second compartment, the refining of the exposed metals surface by top blowing with oxygen, and the tapping of the top-blown melt from the second compartment.

(1) FIELD OF THE INVENTION

Our present invention relates to a process for the metallurgical treatment of metal ores and metal-ore concentrates and, more particularly, to a method of and an apparatus for the pyrometallurgical processing of copper and/or nickel ores or ore concentrates to yield the elemental metal.

(2) BACKGROUND OF THE INVENTION

While metallurgical treatments designed for the refining of copper, nickel and like ores or ore concentrates have been proposed heretofore, substantially all have involved considerable technological difficulties, leading to extensive and expensive research into still further improvements in pyrometallurgical treatments of such raw materials.

The term "pyrometallurgical" is used herein to describe metallurgical techniques using heat as the form of input energy, as distinct, for example, from electrometallurgy in which separation or refining is carried out in whole or in part with the aid of electrical energy.

In conventional methods of recovering copper and nickel from the raw materials, it is customary to melt the ore concentrate, generally making use of gas-fueled or liquid-fueled furnaces and, possibly, the addition of fuel to the raw material so that various reactions may occur during the smelting process. Once the melt is formed, it may be subjected to purification or refining treatments, generally involving the use of slag and a chemical reaction between the melt and the slag. In a series of prior-art techniques, the product of the subsequent treatment is a slag and a body of metal sulfide, referred to in the art as a "matte."

It is possible to extend these principles to the production of elemental metals if, following the formation of metal sulfide, the sulfur is thereafter removed; in the processing of copper ores, for example, it is standard practice to remove part of the sulfur by oxidation or thermal disassociation (i.e. roasting or pyrolysis of the metal sulfide), to remove any iron which is present by oxidizing it and slagging the resulting oxide, and thereafter removing residual sulfide by oxidation to the point that substantially all traces of sulfur are eliminated from the melt. As noted earlier, these processes and the equipment necessary for carrying them out are expensive and complicated and prone to decontrol so that highly skilled personnel are required to monitor the systems.

More recently, the so-called WORCRA process has been proposed as an improvement upon the earlier systems discussed immediately above. In this process, the raw material constitutes iron, tin, nickel or copper ores and the apparatus is designed to permit flow of an underlying metal melt or matte in one direction and an overlying slag in the opposite direction. The reaction of the smelted raw material with the slag is completed in this chamber of opposing flows as this smelted material passes through the slag layer. The extent of this reaction depended, of course upon the residence time of the material in the chamber in contact with the slag and a further disadvantage arose in that the refining is carried out by introducing oxygen into the melt through the slag layer by lances. The ebullition of the metal in contact with the slag results in a loss of metal which appears to be entrained by the slag and cannot be recovered therefrom except for uneconomically long stand periods which are intolerable in commercial production.

It is a significant disadvantage of the WORCRA process, as described above, that it requires, for efficient operation of the process, large treatment chambers and high capital expenditure. Another disadvantage is found in the rapid deterioration of the lining of a furnace used in the WORCRA process, possibly as a result of the long periods in which the metal and other reactants must remain in contact with the lining material.

Still another disadvantage resides in the low throughput of a furnace of the WORCRA process.

Last, but not least, is the disadvantage that the WORCRA process results in losses of considerable quantities of metal when practiced with economically satisfactory residence time in the refining furnace.

It should not be overlooked that, in spite of the many disadvantages of the WORCRA process there are some significant advantages, including that of continuous operation of the process which is associated with reduced fuel consumption, and that of high recovery of sulfur because the sulfur dioxide content of the exhaust gases is significantly higher than that of other pyrometallurgical techniques.

(3) OBJECTS OF THE INVENTION

It is the principal object of the present invention, therefore, to provide a method of pyrometallurgical treatment of metal ores and metal-ore concentrates which is able to maintain the advantages of the WORCRA process but is free from the disadvantages enumerated above.

Another object of our invention is to provide an improved method of refining copper and nickel ores and ore concentrates so as to obtain the corresponding elemental metal, which method is substantially continuous and can be carried out in one chamber, has a high metal yield and is free from the metal losses associated with earlier processes, produces a waste gas more amenable to sulfur recovery than other waste gases, and is more efficient and economical than earlier processes.

Another object of the invention is to provide a process for the recovery of elemental metals from metal ores and ore concentrates, especially copper and nickel ores, in which a single refining chamber is employed but deterioration of the furnace lining is reduced by comparison with earlier systems and improved phase-separation is insured at least in the final stages.

Further, it is an object of our invention to provide an improved apparatus for carrying out the method as described above and which can be operated at lower cost and requires lower capital expenditure than the installations employed in prior-art processes.

(4) SUMMARY OF THE INVENTION

We have discovered, most surprisingly, that the aforementioned objects can be obtained without the disadvantages of the WORCRA process by performing the refining and slag reaction in a single chamber or furnace which is provided with an upright partition reaching close to the bottom of this chamber and subdividing it into an upstream or settling compartment and a downstream oxygen-refining compartment, the melt within the chamber passing from the upstream compartment to the downstream compartment beneath the partition.

This partition defines in the chamber a "trap" which, according to the invention, is operated such that an initial slag layer rises above the melt of metal or matte in both compartments as the raw material is smelted and the melting product cascades through the slag and in reaction therewith to the body of the melt underlying the slag layer in the upstream compartment, the process continuing until the slag layer is disposed wholly above the bottom of the partition whereupon the slag layer in the downstream compartment is drawn off, thereby exposing the melt of matte or metal; the latter is refined, e.g. with oxygen in the downstream compartment to convert the matte and form the elemental metal, whereupon the refined metal is thrown off and the process is repeated.

Hence, the process of the present invention can be described as a pyrometallurgical treatment of particulate copper and/or nickel ores or ore concentrates by melting the latter raw materials with or without additional fuel and with or without the simultaneous volatilization of one or more components of the ore or ore concentrates and/or with or without a partial roasting of the ore or ore concentrates to pyrolytically decompose the latter, to partially oxidize such oxidizable compositions as sulfur, or otherwise increase the metal concentration of the melt obtained from the initial smelting of the raw material.

The smelting step is carried out, in accordance with the present invention, by subjecting the raw material to oxidation in the presence of hot gases and with possible addition of fuel to the raw material to increase the exothermic effect.

The melt is collected in accordance with the present invention and subjected to further processing in an arrangement in which two communicating chambers are formed, as subdivided by a partition which is virtually vertical and may extend upwardly above the maximum level of the bath but downwardly close to the bottom so that only the melt (of metal or matte) collected in the chamber proximal to the melting device (upstream chamber) can pass beneath the partition into a chamber distal from the melting device (downstream chamber), while the slag cannot pass beneath this partition when the metal or matte melt is present. The removal of the slag and the further processing of the matte are carried out in the downstream chamber which may represent one of a number of such chambers provided in succession as required. The chambers downstream of the collecting chamber and upstream of the final chamber are termed "intermediate" chambers for convenience.

The particulate ores or ore concentrates are preferably melted with the aid of oxygen-containing gas, e.g. air or oxygen-energized air, or with gases free from foreign substances which may remain in the melt or may adversely affect the reaction; it has been found that best results are obtained when the heating gas is a mixture of oxygen and sulfur dioxide.

The heating device, according to the invention is preferably of the cyclone type wherein the gas mixture is introduced tangentially and one or more axial burners or gas inlets may also be provided. In such burners, the hot gases engage in cyclonic movement and entrain the particulate metal in a similar movement outwardly along the walls of the cylindrical heating chamber at which a film of the melt is maintained. The melting step thus involves a solid/gas phase interaction between the particulate material and the oxygen-containing gases, a liquid/gas phase reaction between the oxygen-containing gases and the liquid film and a solid/liquid reaction between the liquid phase of the melt and the solid phase of the unsmelted particles. The high surface areas of liquid and solid involved in these reactions assure high reaction efficiency. The heat of reaction may be recovered in part, by heat exchangers and returned to the melting process.

The refining of the melt in the downstream chamber or chambers is carried out preferably by top blowing although other refining techniques may be employed provided, as is important to the present invention, that the slag layer atop the melt in this chamber has been removed. The top-blowing gas also is preferably an oxygen-containing gas such as air or oxygen-enriched air and, in its most advantageous composition consists of oxygen and sulfur dioxide.

(5) DESCRIPTION OF THE DRAWING

The above and other objects, features and advantages of the present invention will become more readily apparent from the following description and specific examples, reference being made to the accompanying drawing in which:

FIGS. 1A–1G are vertical cross sections diagrammatically illustrating successive stages of the refining process according to this invention;

(6) SPECIFIC DESCRIPTION

Figure 2:
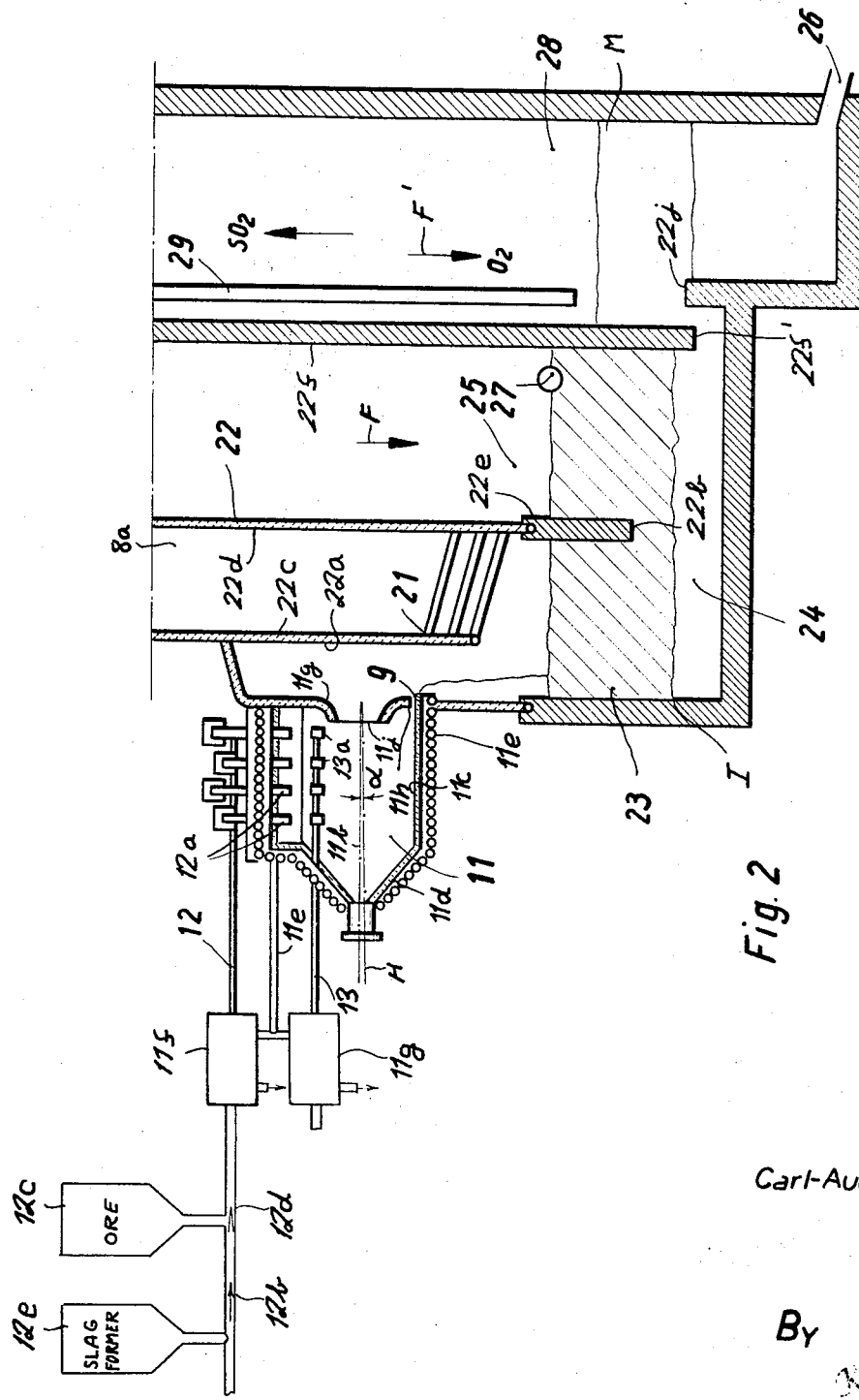
FIG. 2 is a vertical cross-sectional view, partly in diagrammatic form, through an apparatus embodying the principles set forth above.

The system for carrying out the method of the present invention is diagrammatically illustrated in FIG. 1A but is analogous to that shown in structural form in FIG. 2. The apparatus comprises a melting cyclone 11 provided with an axial burner 10 and an inlet 11a for the particulate raw materials and oxygen-containing gas streams as previously noted.

The waste gas of this process emerges axially as represented by the arrow A while the molten product is discharged along the lower wall of the cyclone through an outlet or nozzle 9 in a cascade represented by the arrow B. The housing 15 of the apparatus is an upright shaft provided with an exhaust gas duct 8 at its upper end leading to a sulfur or sulfurdioxide recovery stage of any conventional type.

The duct 8 may also be connected, as described in our copending application Ser. No. 11,107, filed Feb. 13, 1970 and entitled "Process and Apparatus for the Pyrometallurgical Treatment of Sulfidic Iron Ores and Concentrates," to condensers, precipitators and dust-removal apparatus for the recovery of any entrained metals or metal particles.

The interior of the shaft furnace 15 is subdivided horizontally by a vertical partition 22 whose surface 22a constitutes an impingement baffle against which the gases emerging from the cyclone 11 are directed, whereby a substantial directional change is imparted to the gas and impingement separation of any melt droplets entrained by the gas is effected along the surface 22a, these droplets passing into the melt in the chambers 23 and 25 at the bottom of the partition. The partition 22 has a height well above the maximum height of the melt in the furnace and preferably reaches above level of the outlet of the cyclone 11.

The partition 22 subdivides the interior of the refining furnace 15 into the chambers 23 and 25, referred to earlier as the upstream and downstream chambers or the chamber proximal to the heating device 11 and the chamber distal from this heating device, respectively.

The bottom 22b of the partition 22 is located just above the floor 15a of the furnace to define a melt-collection compartment or chamber 24 which communicates between the upstream chamber 23 and the downstream chamber 25. The downstream chamber 25 is, moreover, provided with a slag-outlet opening 27 at a location above the bottom 22b of the partition 22, thereby defining the upper level of the molten-metal or matte bath within the refining furnace. This distal chamber is also formed with a metal-outlet opening 26 which is generally closed and can be opened by a tapping, piercing or boring machine of conventional design or may be provided with a valve. The opening 26 is located substantially at the base 15a of the separating and refining chamber.

The sequence of the several stages of the present method are illustrated diagrammatically in FIGS. 1A–1G, the slag layer being represented at S, or S', S" and S'" by sectional hatching while the metal melt is represented at M, M' and M" by liquid hatching.

The burner 10, disposed at the apex of the melting cyclone 11, heats the lined walls thereof to the reaction temperature, i.e. the temperature at which oxygen-containing gases will react with the sulfur-containing copper and nickel ores or ore concentrates. Particulate ores or ore concentrates and, if desired, slag-forming substances such as silica, lime, calcium carbonate, calcium sulfate, are introduced into the melting cyclone as represented by the arrow 11a along a secant or tangent. The oxygen-containing gas is simultaneously supplied in this direction and at a velocity sufficient to spread the particulate matter outwardly along the walls of the cyclone, whereupon a smelting and chemical reaction of the raw material and the oxygen-containing gas takes place to yield, as reaction products, liquid matte (e.g. of copper or nickel) and slag. The sulfurdioxide-containing waste gases, which may also carry unoxidized sulfur produced by pyrolytic decomposition of sulfidic ores or ore concentrates passes, as represented by the arrow A, upwardly into the waste-gas duct 8 for treatment in the manner described previously.

From the outlet opening 9, the liquid phase cascades downwardly into chamber 23 and forms a pool of slag S as a layer atop a pool M of the matte or molten metal. In FIG. 1B, it is apparent that the slag and matte layers both lie below the bottom 22b of the partition. With continued operation of the cyclone 11 in the second stage of the process, the liquid level in the bath increases until the top of the slag layer reaches the bottom of the partition.

In stage 3, the quantity of matte M and slag S is increased progressively until (FIG. 1C) the interface between the slag and matte layers reaches the bottom of the partition. The slag is thus subdivided into two columns S' rising respectively in the chambers 23 and 25. The slag in chamber 25 remains quiescent or passive while the slag in chamber 23 actively continues to be involved in the reaction between slag and matte as freshly introduced. Entrained copper (in the case of a copper-recovery system) can be precipitated from the slag column S' in chamber 25 as represented by the arrow C by the addition of pyrites whereupon copper sulfide precipitates and enters the underlying melt M of copper matte.

The operation of the melting cyclone continues until the interface I between slag and matte reaches the level of outlet 27 (FIG. 1D and stage 4), whereupon this partial slag column is tapped and removed completely (drained). From FIG. 1E (stage 15) it is apparent that the surface of column M' of the matte has now been exposed and refining can be carried out with an oxygen-containing gas stream represented by the arrow F using top-blowing techniques. The oxygen reacts with the sulfur of the sulfide matte to produce sulfur dioxide which rises in chamber 25 as represented by arrow G and is combined with the gases of arrow A previously described. The product of this refining step is of course elemental copper. It is important to note that overoxidation cannot occur or be a problem in the system of the present invention, since the melting cyclone continuously introduces fresh quantities of copper sulfide to react with any copper oxide so that substantially pure elemental copper exists in the layer M'. At a point at which substantially all of the layer M is metallic copper, the opening 26 is tapped (stage 6 and FIG. 1F) and the elemental metal is withdrawn until matte begins to emerge. The fresh slag passes under the wall 22 into chamber 25 and, once the level of the slag reaches the lower edge of the partition 22, the subdivision into column of the slag S'" and the repetition of the refining of the matte layer M" can be effected. The process, of course, repeats as is apparent from a comparison of FIGS. 1C and 1G.

In the described process, a stream of molten matte flows continuously from the melting device 10, 11 etc. through the molten slag in the upstream chamber 23 into the sump consisting of molten matte. In the case of the refining of raw copper, the matte will usually consist of a solution of copper sulfide and iron sulfide ($Cu_2S \cdot FeS$) while, in other cases, it may consist essentially of $Cu_2S$. The slag bath is not stirred and the only movement which occurs is the flow of the melt and the spread of the left-hand slag column of the upstream slag column into the downstream chamber; deterioration of the lining walls is held to a minimum.

The roasting of the ore or ore concentrate and any volatilization of ore components and the formation of slag by chemical reaction is effected mainly before the melt enters the bath so that only minor reactions between matte and slag and only separation of the molten phases is carried out in the first chamber of the device. In accordance with Stoke's Law the settling velocity of the metal sulfide particles in the slag, which is crucial for the effective separation of the phases, is given by the formula:

$$v = \frac{2}{9} g \frac{r^2(d_1 - d_2)}{\zeta}$$

in which only the particle radius $r$ and the viscosity $\zeta$ of the slag may be independently controlled if the acceleration due to gravity $g$, the specific gravity $d_1$ of the slag and the specific gravity $d_2$ are given or are variables which cannot easily be altered. By creating a coherent jet by means of which the melt is directed into the settling chamber, it is possible to establish the maximum particle radius $r$ and to control the temperature to provide the desired viscosity and thereby yield an optimum separation.

When multipartition separations are carried out, the "resolution of the device" can be increased to yield a slag-free copper with a higher specific gravity than the product of an apparatus with a lesser number of stages.

In FIG. 2 of the drawing we show, in structural form an embodiment of the apparatus for carrying out the present invention in which the melting cyclone 11 is of the type described and illustrated in our application identified above.

That application is directed to the pyrometallurgical treatment of sulfidic iron ores and recites, in the most preferred embodiment, a cyclone furnace having a substantially horizontal axis, i.e. a horizontal axis or an axis including an angle of 0° to 30° with the horizontal.

Within the furnace, a reaction temperature of at least 1300° C. can be sustained by the introduction tangentially or along a secant of the cylindrical furnace chamber, of a flow of gases rich in oxygen. The ore or ore concentrate is introduced at a plurality of axially spaced locations along the furnace in the direction of a tangent or secant thereof while oxygen-rich gas is introduced along a tangent or secant at a plurality of axially offset locations; the walls of the cyclone furnace are cooled with water vapor or steam, by evaporation of water against a pressure of at least 10 atm. gauge.

It was believed that the high velocity of the gases within the cyclone furnace and the tangential or substantially tangential introduction of the sulfides and the gases, as well as the fact that the walls of the furnace are cooled in the manner set forth, provide a film of the molten matte along the wall of the furnace to protect the latter against deterioration. The outlet of the reactor is formed with a central passage defined by a generally annular wall, through which the gases emerge into a separation stage from which any residual particles are precipitated and in which further separation of the components of the gas can be carried out. Between the latter wall and the floor of the furnace there is provided a narrow outlet or nozzle for the liquid melt which cascades into a hearth in which separation of gangue or slag from the metal melt is sustained. The substantially horizontal axis of the furnace ensures a relatively long residence time within the furnace proper and therefore permits equalibrium in the first-stage desulfurization reaction to be achieved. A gas velocity within the cyclone of the order of 100 m./sec. has been found to maintain the thin film mentioned earlier and bring about optimum contact of the film and the gases. The fact that the gases and sulfide materials are introduced through a plurality of feed openings, not only permits adjustment of the feed to the treatment capacity of the furnace, but also allows compensation at the input for variations in the metallurgical properties of the raw materials and permits relatively simple control of the heat conversion of the furnace.

The system of the above-identified application also includes a collecting grate which may be traversed by the gases after they pass from the cyclone and are subjected to a direction change of approximately 180°. The direction change, from a downward to an upward direction, permits any massive particles entrained by the gases to be diverted therefrom by virtue of their kinetic energy and inertia and to enter the hearth in which separation of the matte from the slag takes place. The U-shaped path is formed, in part, by a baffle disposed ahead of the gas outlet of the cyclone reactor and forming an impingement surface which also contributes to the separation of solids and droplets from the emergent gas stream. Downstream of the direction-reversal and sedimentation portion of the gas-outflow path is provided a cooled collection grate upon which is accumulated fly ash and droplets of matte from the gas, the effluent passing the grate and containing traces of residual fly dust, trivial quantities of uinseparated matte droplets and condensed volatile components.

Reverting to FIG. 2, it will be seen that the furnace 11, like the furnace of the aforementioned application, comprises a refractory-lined cylindrical wall 11c centered on an axis 11b defining an angle $\alpha$ with the horizontal H such that $0° \geq \alpha \geq 30°$ and a frustoconical portion 11d remote from the outlet 9. The cylindrical portion 11c and the frustoconical portion 11d are surrounded by cooling ducts 11e which may be built into the wall of the cyclone furnace and may conduct steam or water, at least part of the heat of which may be recovered at 11e and used via heat exchangers 11f and 11g to preheat the materials introduced into the cyclone furnace, thereby recovering reaction heat for use in the melting process.

The cyclone furnace 11 has an array of tangential inlets 12a connected via a conventional manifold to a conduit 12 through which an airstream or a mixture of air or oxygen and sulfur dioxide, introduced at 12b entrains particles of the ore or ore concentrate from a hopper 12c via a verturi 12d. The inlets 12a are angularly offset from inlets 13a connected by a suitable manifold to the line 13 carrying secondary air, oxygen or an oxygen-sulfuric oxide mixture passing through the heat exchanger 11g. A slagging agent, e.g. lime, may be introduced by another venturi into line 12 from the hopper 12e.

At its outlet side, the cyclone melting furnace 11 is formed with an outwardly divergent central opening 11j formed in a wall 11g entrained upon the surface 22a of a partition wall assembly generally illustrated at 22 in this figure. Between the underside 11h of the wall 11g and the floor of the furnace and at its right-hand end thereof, there is formed the outlet 9 previously described.

The wall 22 which divides the separating and refining column into the compartments 23, 24 and 25, comprises a pair of wall members 22c and 22d together defining between them a gas-outlet duct 8a communicating with the duct 8 described in connection with FIG. 1A. At the entry end of the duct 8a, there is provided a water or steam-cooled grate, functioning similarly to the corresponding grate of the above-identified application, to function as a filtering device and trap any matte particles or slag particles which may be entrained by the gas stream. The partition is formed by a relatively massive lower wall portion 22e suspended from the wall portion 22d and lying in a vertical plane substantially midway of the compartments 24 and 25. The outlet side of the latter compartment is defined by a further vertical partition 22f which reaches below the bottom 22b of the partition 22 and to a level generally below the level I of the interface between the slag and the matte. The slag outlet is here represented at 27. The bottom 22f' of the partition of 22f lies below a weir 22j which defines therewith a U-shaped seal communicating between the chamber 24 below the col. 25, and a chamber 28 in which additional refining can be carried out. As represented by the arrow F in this figure, iron pyrites may be introduced to precipitate copper remaining in the body or slag in chamber 25. This chamber thus serves to remove copper and/or nickel from the slag.

In the third chamber 28, a desulfurization is effected to convert the matte into the elemental metal. Oxygen-containing gases are blown onto the top of the molten metal matte M in chamber 28 through a lance 29 as represented by arrow F' while sulfur-dioxide gases pass upwardly through the chamber 28 and are combined with the gases in duct 8 as previously described.

Figure 3:
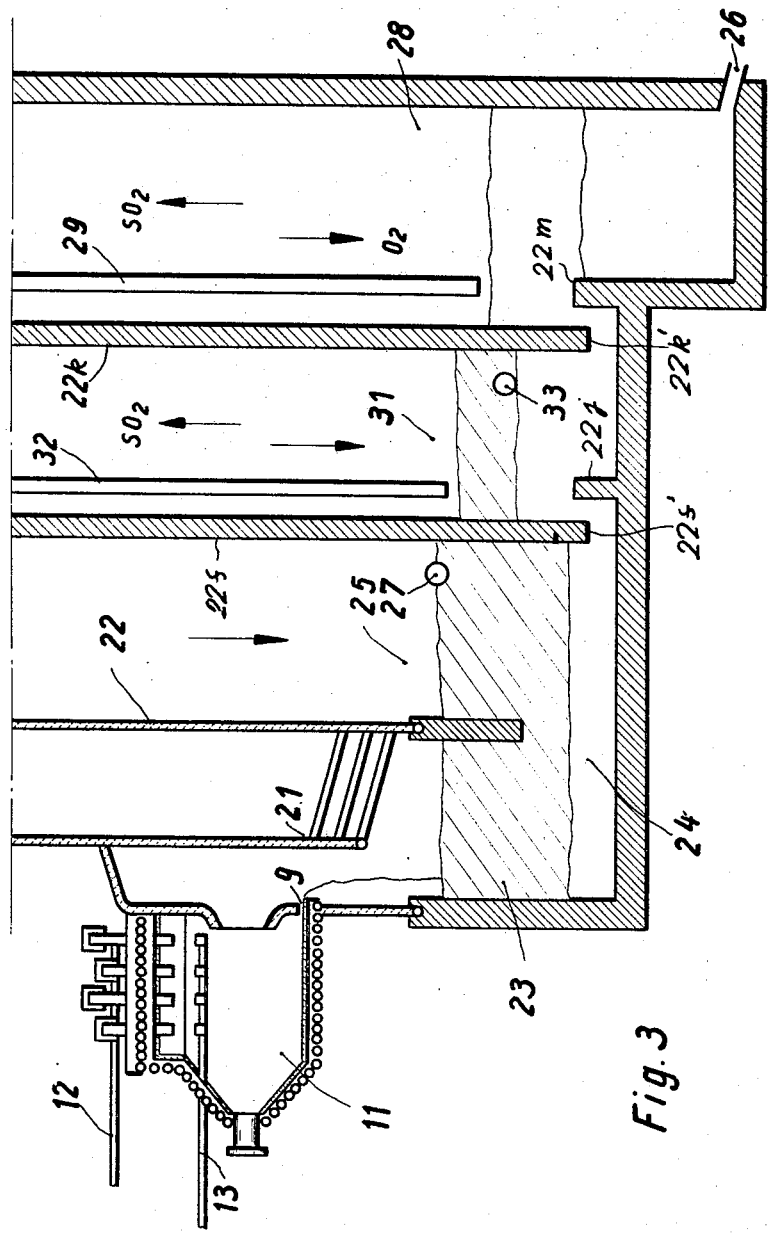
FIG. 3 is a view similar to FIG. 2 wherein, however, a further intermediate compartment is provided.

In FIG. 3, there is illustrated a modification which includes still another chamber formed by a partition 22k, the chamber 31 between the partitions 22f and 22k serving as a primary oxidation chamber while secondary and final oxidation is carried out in chamber 28. In chamber 31, there occurs a slagging of any iron which may be carried along from the previous chamber 25 so that all of the iron is removed and the oxidation reaction occurs in chamber 28 without secondary reactions which might otherwise involve the iron.

The bottom of partition 22f' is located below the top of weir 22j while the bottom of partition 22k' is located below the weir 22m, the weirs being spaced downstream from the respective partitions to define U-shaped ducts serving as liquid traps in which the liquid matte forms a seal to prevent a transfer of slag from the chambers 23, 25 to the chambers 28 and 31 and from the chamber 31 to the chamber 28 in FIG. 3.

Only liquid matte enters the chamber 28 and flows thereto at a rate which depends upon the relative specific gravities of the matte and slag. As long as the matte column in equilibrium with the slag head exerts a hydrostatic pressure which is equal to the pressure of the slag column extending to the level of the tap 27, slag will be discharged through that opening. When metal has been removed from the chamber 28 in such amount that the pressure of the matte/metal column is lower than that of the slag column, the level of the slag will drop below the slag-outlet opening. Slag will no longer be discharged and the matte will be transferred from the sump 23 into the chamber 28 until the equilibrium associated with the hydrostatic head is re-established. At no time can slag enter the chamber 28 along with the matte.

As the process continues, the discharge of slag is interrupted until the hydrostatic pressure of the metal/ metal sulfide column in chamber 28 causes the slag level to fall below the slag outlet opening 27. This does not influence the continuous sedimentation of copper matte or the influx thereof. The apparatus enables a continuous or discontinuous withdrawal of the slag while the melt is fed continuously. Sulfur dioxide and the liquid metal formed by the refining step may be removed continuously or discontinuously. This enables an optimum adaptation of the apparatus according to the invention to the requirements of the equipment for further processing.

Another measure whereby the apparatus according to the invention can be adapted to equipment for further processing resides in the design of the several treating chambers, particularly the chamber 28, so as to have suitable cross-sections and predetermined capacities for matte, product metal and possibly sulfur dioxide. The intervals of time between successive refining operations and between the steps whereby the product metal is tapped may then be virtually as short or as long as desired.

(7) SPECIFIC EXAMPLES

The process according to the invention and the mode of operation of the apparatus according to the invention will now be explained more fully with reference to the following examples.

Example 1 (FIG. 2)

A copper concentrate is processed which is composed of:

30% by weight copper,
30% by weight Fe,
34% by weight S, and balance gangue.

That concentrate is mixed at a rate of 4160 kilograms per hour with silica at a rate of 900 kilograms per hour. The mixture is dried to a residual moisture content of about 1% and then in suspension in 300 standard cubic meters of oxygen-containing gas (containing 70% by volume oxygen) per hour is fed through conduit 13 to the melting cyclone 11 along a secant thereof. The suspension of ore, silica and gas enters at a velocity of 20 meters per second and at a temperature of 200° C.

Oxygen-containing gas (70% oxygen) is blown in at the same time in the direction of the tangent through the conduit 12 at a rate of 1250 standard cubic meters per hour and at a velocity of 100–150 meters per second. The oxygen-containing gas had a temperature of 350° C.

A melt consisting of 1.57 metric tons of copper matte ($Cu_2S$) and 2.75 metric tons of slag containing about 58% FeO is formed per hour in the melting cyclone 11. Gases composed approximately of 56% $SO_2$, 35.8% $N_2$ and 8.2% $O_2$ are also formed at a rate of 1385 standard cubic meters per hour.

The melt leaving the melting cyclone 11 through opening 9 is at a temperature of about 1400° C. and first enters the chambers 23, 24 and 25, where the melt is separated into slag having a copper content of 0.4% and into copper matte. 20 kilograms of iron pyrites ($FeS_2$) per hour are added in chamber 25 so that the copper content of the slag is reacted to form copper sulfide, which combines with the copper matte.

As the process proceeds, slag at a temperature of 1300° C. is continuously discharged through the slag outlet opening 27. Copper matte enters at the same time the chamber 28, where it is refined with the aid of a gas which is supplied through lance 29. The gas, introduced at a rate of 330 standard cubic meters per hour, consists of 70% oxygen and 30% sulfur dioxide. Sulfur dioxide at a total rate of 309 standard cubic meters per hour is formed. Of that quantity, 99 standard cubic meters per hour are supplied in the gas which is supplied through the lance 29. Refining results in the formation of 1256 kilograms copper per hour, at a temperature of 1250° C. which is withdrawn through the metal outlet opening 26 at intervals of 15 minutes.

Example 2 (FIG. 2)

A nickel-copper concentrate is processed which is composed of:

5.5% Ni,
2.0% Cu,
43.0% Fe,
28.0% S, and
21.5% gangue.

11 metric tons of this concentrate are mixed with 22 metric tons of sand, ground to a particle size up to 150 microns, and as a suspension at a rate of 5.1 metric tons per hour with oxygen-enriched air (70% $O_2$) at a rate of 350 standard cubic meters per hour, fed through the conduit 13 to a melting cyclone 11 along a secant. The suspension enters at a velocity of 20 meters per second and a temperature of 200° C.

Oxygen-containing gas (70% $O_2$) at a rate of 1400 standard cubic meters per hour and at a velocity of 100 meters per second is injected at the same time through conduit 12 in the direction of a tangent to the interior of the melting cyclone. The temperature of the oxygen-containing gases is 350° C.

A melt which consists of 4.1 metric tons of slag and 430 kilograms nickel-coper matte per hour is formed in the melting cyclone 11. The slag is composed of 56% FeO, 20% $SiO_2$, 24% gangue. The matte consists of 54% Ni, 20% Cu and 26% S. 2.1 metric tons sulfur dioxide per hour are also formed in the melting cyclone 11 and escape in a gas which flows at a rate of 1380 standard cubic meters per hour and is composed of 53.4% $SO_2$, 38% $N_2$ and 8.6% $O_2$.

The melt leaves the melting cyclone 11 through opening 9 at a temperature of 1450° C. and is separated in chambers 23, 24 and 25 into slag having a copper-nickel content of about 0.5% and copper-nickel matte. Pyrites are added at a rate of 30 kilograms per hour in chamber 25 to remove most of the copper and nickel content of the slag. The copper and nickel thus removed are combined with the main amount of the copper-nickel matte. Through the slag outlet opening 27, the slag is discharged continuously at a temperature of 1350° C. whereas the copper-nickel matte enters the chamber 28 under the partition 22.

In the chamber 28, the matte is refined to form a copper-nickel alloy and to this end is treated with oxygen-containing gas (80% $O_2$, 20% $SO_2$) at a rate of 103 standard cubic meters. The refining operation results in the production of $SO_2$ at a total rate of 100 standard cubic meters per hour. Of that rate, 20 standard cubic meters have been supplied in the oxygen containing gas. A copper-nickel alloy containing 73% nickel and 27% copper is formed at the same time at a rate of 318 kilograms per hour and is periodically discharged in intervals of 30 minutes at a temperature of 1400° C. through the metal outlet opening 26.

Example 3 (FIG. 3)

Nickel metal is recovered from a nickel-iron silicate (garnierite), which is composed of:

5.5% Ni,
0.2% Co,
0.4% Cr,
45.0% $SiO_2$,
12.0% Fe, and
25.0% MgO.

100 parts of the ore are mixed with:

24 parts calcium sulfate,
7 parts calcium carbonate, and
25 parts coke and ground to a fineness of 90% below 200 microns.

At a rate of 6.5 metric tons per hour, the above-mentioned mixture is charged through the conduit 13 in the direction of a secant in a suspension in oxygen-enriched air (70% $O_2$) into the melting cyclone 13, which has been preheated with oil. Oxygen-containing gases at a total rate of 2170 standard cubic meters per hour are supplied to the melting cyclone and divided in a ratio of 1:4 between the supply conduits 12 and 13.

Slag at a rate of 4 metric tons per hour and raw matte at a rate of 0.42 metric ton per hour are discharged through the opening 9 from the cyclone. The slag is composed of 12% FeO, 48% $SiO_2$, 26% MgO and 14% CaO and the raw matte is composed of 50% Ni+Co, 30% Fe and 20% S. The melt has a temperature of 1500° C. and is separated in chambers 23, 24 and 25 into raw matte and slag, which is continuously discharged through the outlet opening 27 at a temperature of 1450° C.

The raw matte passes under the partition 22 into the chamber 31, in which $SiO_2$ at a rate of 75 kilograms per hour and 100% oxygen supplied through lance 32 at a rate of 133 standard cubic meters per hour are added. This operation results in the formation of iron silicate containing 65% FeO and $SiO_2$ (35%) at a rate of 246 kilograms per hour and nickel matte ($Ni_3S_2$) composed of 74% Ni and 26% S at a rate of 308 kilograms per hour.

The resulting iron silicate is withdrawn through the slag outlet opening 33. The nickel matte is passed under the partition 22 into the chamber 28, where it is refined with the aid of virtually 100% oxygen at a rate of 58.3 standard cubic meters per hour. $SO_2$ is formed at a rate of 53.7 standard cubic meters per hour and together with non-reacted oxygen at a rate of 5 standard cubic meters per hour is discharged for further processing.

A nickel alloy composed of 97% Ni and 3% Co is formed at a rate of 233 kilograms per hour. This alloy is collected in the hearth of chamber 28 and is tapped there in intervals of about 30 minutes. The temperature of the nickel alloy in the hearth is about 1550° C.

We claim:
1. A method of treating a copper and/or nickel ore or ore-concentrate, comprising the steps of:
    (a) smelting said ore or ore-concentrate and forming a metallurgical matte and a liquid slag therefrom;
    (b) collecting said matte and said slag in an upstream compartment of a settling chamber subdivided into said upstream compartment and a downstream compartment by a partition reaching downwardly into said chamber but terminating above the floor thereof, said compartment communicating beneath said partition;
    (c) raising the level of the top of the matte in said chamber to the bottom of said partition;
    (d) draining the slag from above said matte in said downstream compartment; and
    (e) refining said matte in said downstream compartment upon removal of said slag from atop the matte therein by blowing an oxygen-containing gas against the top of the matte in said downstream compartment.

2. The method defined in claim 1 wherein said ore or ore-concentrate is in particulate form and is smelted in step (a) by introducing the particulate ore or ore-concentrate and an oxygen-containing gas generally tangentially into a cyclone furnace maintained at the reaction temperature of said ore or ore-concentrate whereby part of the volatile components thereof are vaporized and said ore or ore-concentrate is reacted with the gas and is transformed into said matte and said slag, said matte and said slag being delivered continuously to said upstream compartment of said chamber.

3. The method defined in claim 2 wherein said gas consists essentially of oxygen and sulfur dioxide.

4. The method defined in claim 2, further comprising the step of abstracting heat from an $SO_2$-containing gas from said chamber and recovering the abstracted heat for use in the melting of said ore or ore-concentrate.

5. The method defined in claim 1 wherein the oxygen-containing gas blown onto said matte in step (e) further comprises sulfur dioxide.

6. The method defined in claim 2 wherein waste gas is expelled from said cyclone furnace, further comprising the steps of intercepting the waste gas upon its emergence from said cyclone furnace and separating particles therefrom, the particles entering the matte and slag in said upstream compartment, passing the matte into at least one intermediate compartment below a further partition prior to the blow of the matte into said downstream compartment and precipitating copper from said slag in said intermediate compartment by adding pyrites thereto, said slag being drained from said matte in said intermediate compartment.

7. The method defined in claim 6, further comprising the step of passing said matte from said downstream compartment into a final refining compartment beneath another partition, the blowing of oxygen onto said matte in said downstream compartment forming a further slag on the matte therein, and draining the further slag from the matte in said downstream compartment prior to passing the matte into said final refining compartment for treatment with an oxygen-containing gas therein.

References Cited
UNITED STATES PATENTS

| | | | |
|---|---|---|---|
| 1,976,735 | 10/1934 | Kuzell | 75—74 X |
| 2,572,489 | 10/1951 | Jordan | 75—45 X |
| 2,668,107 | 2/1954 | Gordon | 75—74 |
| 2,758,022 | 8/1956 | Jordan | 75—76 |
| 3,069,254 | 12/1962 | Queneau | 75—82 |
| 3,437,475 | 4/1969 | Themelis | 75—74 X |

L. DEWAYNE RUTLEDGE, Primary Examiner

J. E. LEGRU, Assistant Examiner

U.S. Cl. X.R.

75—76, 82